(12) United States Patent
Northcut et al.

(10) Patent No.: US 8,171,844 B2
(45) Date of Patent: May 8, 2012

(54) GRIDDLE FOR A COOKING APPLIANCE

(75) Inventors: Jason Northcut, Louisville, KY (US);
Michael Thomas Chezem, Georgetown, IN (US); David Joseph Najewicz, Prospect, KY (US); Daniel Joseph Trice, Louisville, KY (US); Guy Henry Turner, Chicago, IL (US)

(73) Assignee: General Electric Company, Schenectady, NY (US)

( * ) Notice: Subject to any disclaimer, the term of this patent is extended or adjusted under 35 U.S.C. 154(b) by 660 days.

(21) Appl. No.: 12/341,322

(22) Filed: Dec. 22, 2008

(65) Prior Publication Data

US 2010/0154654 A1 Jun. 24, 2010

(51) Int. Cl.
*A47J 37/10* (2006.01)

(52) U.S. Cl. ............................. 99/425; 99/422

(58) Field of Classification Search ............... 99/372, 99/422–425; *A47J 3/10*
See application file for complete search history.

(56) References Cited

U.S. PATENT DOCUMENTS

| | | | | |
|---|---|---|---|---|
| 1,447,813 A * | 3/1923 | Patrick | ............................ | 99/425 |
| 1,732,554 A * | 10/1929 | Detwiler | ........................ | 99/422 |
| 2,172,469 A * | 9/1939 | Grigas | ........................... | 99/422 |
| 2,198,647 A * | 4/1940 | Wolcott | ......................... | 99/422 |
| 2,254,570 A * | 9/1941 | Hailey | ............................ | 99/422 |
| 2,351,130 A * | 6/1944 | Jones | ............................. | 99/425 |
| 2,722,173 A * | 11/1955 | Cunningham | ................ | 249/168 |
| 2,766,683 A * | 10/1956 | Kanz | .............................. | 99/425 |
| 2,879,708 A * | 3/1959 | Cripe | ............................. | 99/425 |
| 3,227,067 A * | 1/1966 | Klemm | .......................... | 99/425 |
| 4,564,001 A * | 1/1986 | Maeda | .......................... | 219/621 |
| 5,487,329 A * | 1/1996 | Fissler | ........................... | 99/422 |
| 5,532,461 A * | 7/1996 | Crummenauer et al. | ........ | 99/422 |

FOREIGN PATENT DOCUMENTS

FR 2531329 A1 * 2/1984

* cited by examiner

*Primary Examiner* — Stephen F Gerrity
(74) *Attorney, Agent, or Firm* — Global Patent Operation; Douglas D. Zhang

(57) ABSTRACT

A griddle for a cooking appliance is disclosed. The griddle includes a main body having a first surface, a second surface opposite the first surface, and a recessed area formed on the second surface, the recessed area having a center, a periphery, and a thickness which diminishes from the periphery toward the center.

20 Claims, 6 Drawing Sheets

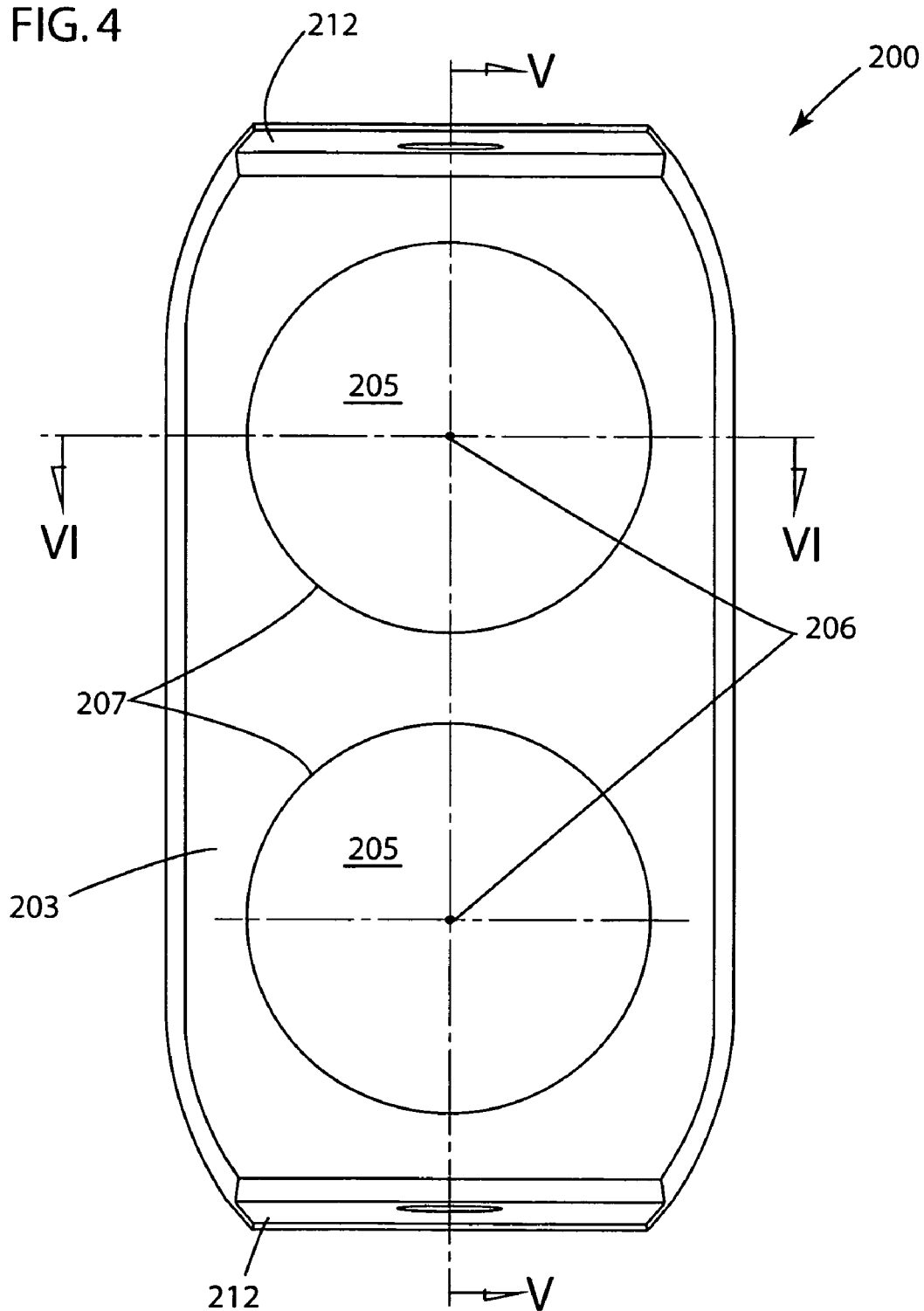

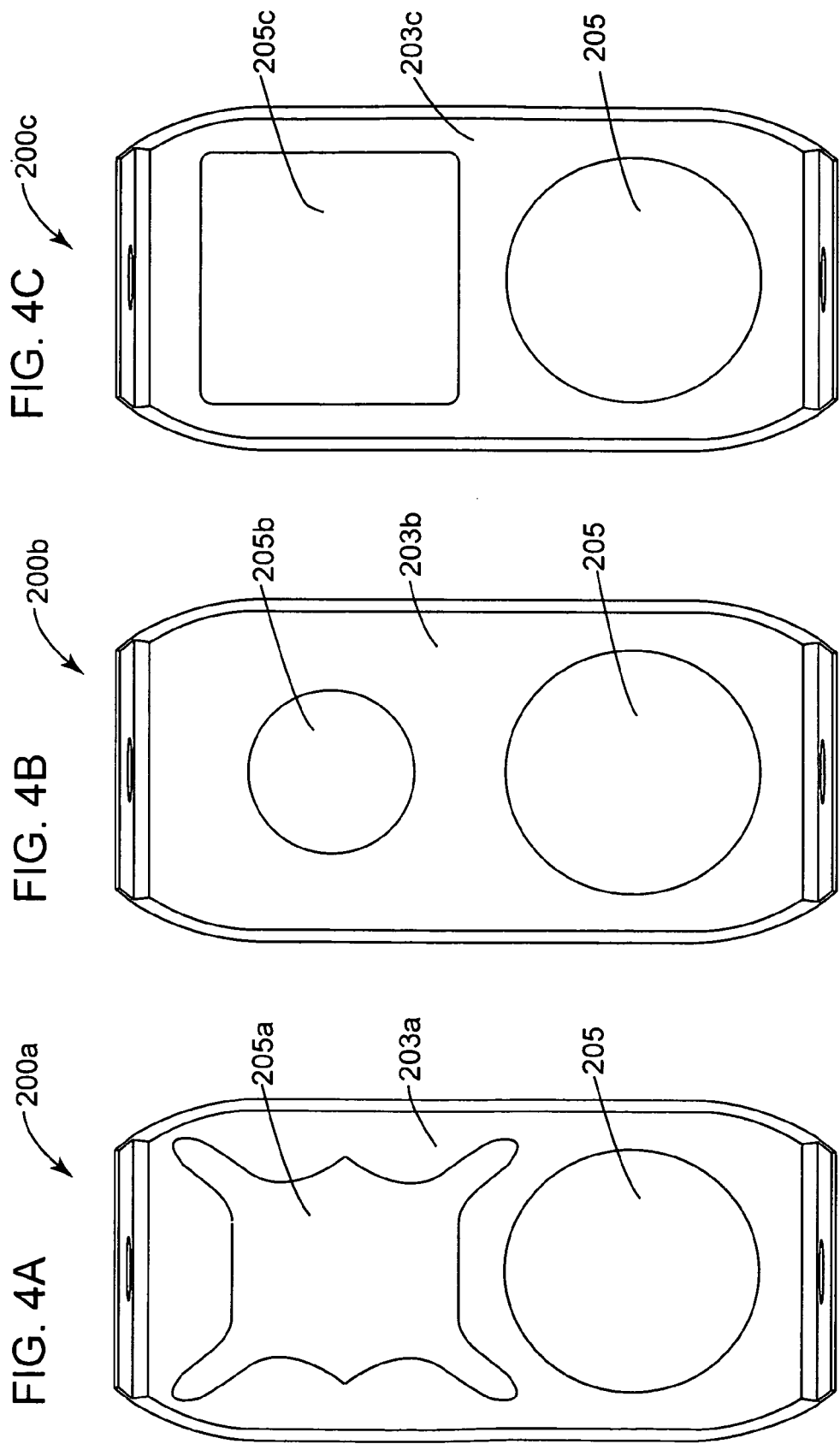

655.5° F
384.2° F 686.81° F
477.86° F

GRIDDLE FOR A COOKING APPLIANCE

BACKGROUND OF THE INVENTION

The present invention relates generally to an accessory for a cooking appliance. More particularly, the present invention relates to a griddle for a cooking appliance such as a cooking range or a cooktop.

Griddles are widely used on cooking appliances such as cooking ranges and cooktops. As is known in the art, a cooking range or a cooktop typically has at least one surface heating unit. A griddle, which is typically placed above one or more surface heating units of a cooking appliance, provides a substantially flat cooking surface. When the surface heating units are radiant burners (i.e., electric burners), the griddle is typically made of cast iron and has a uniform thickness in its cooking area. The disadvantage of such a griddle is that the temperature gradient across the cooking area is relatively large.

Therefore, it would be desirable to provide a griddle with a more even heat distribution across its cooking area.

BRIEF DESCRIPTION OF THE INVENTION

As described herein, the exemplary embodiments of the present invention overcome one or more of the above or other disadvantages known in the art.

One aspect of the present invention relates to a griddle for a cooking appliance. The griddle includes a main body having a first surface, a second surface opposite the first surface, and a recessed area formed on the second surface, the recessed area having a center, a periphery, and a thickness which diminishes from the periphery toward the center.

Another aspect of the present invention relates to a griddle for a cooking appliance having a surface heating unit. The griddle includes a thermally conductive main body having a top surface, a bottom surface, and a recessed area formed on the bottom surface, the recessed area having a center, a periphery, and a thickness which diminishes from the periphery toward the center. When the griddle is properly placed on the cooking appliance, the recessed area is substantially aligned with and faces the surface heating unit.

These and other aspects and advantages of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and that, unless otherwise indicated, they are merely intended to conceptually illustrate the structures and procedures described herein.

BRIEF DESCRIPTION OF THE DRAWINGS

FIG. 4 is a bottom view of the griddle of FIG. 1;

FIGS. 4A, 4B and 4C are bottom views of other exemplary embodiments of the griddle;

DETAILED DESCRIPTION OF THE EXEMPLARY EMBODIMENTS OF THE INVENTION

Figure 1:
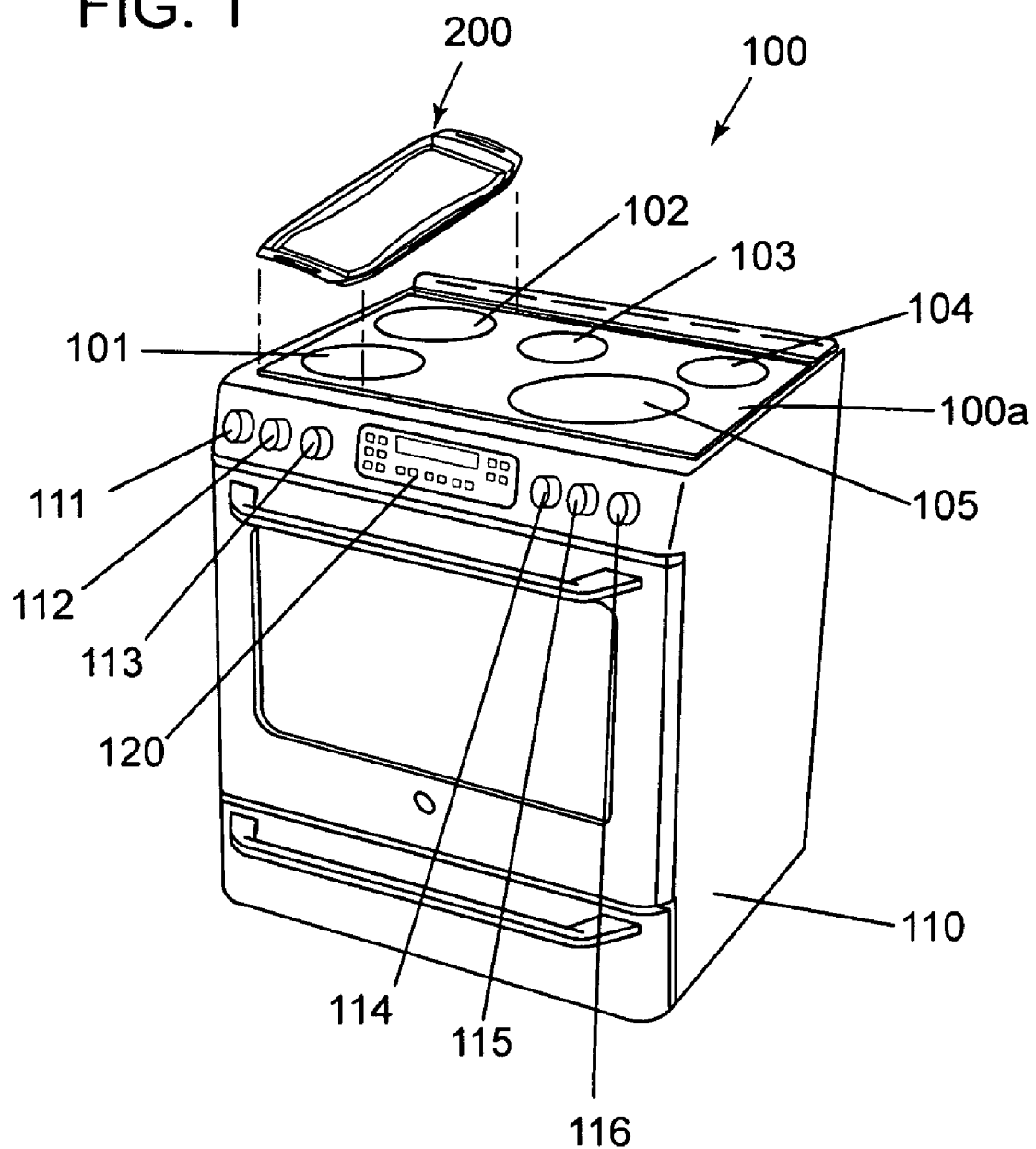
FIG. 1 is a perspective view, showing a cooking range and an exemplary embodiment of a griddle in accordance with the present invention.

FIG. 1 shows an exemplary cooking appliance 100 and an exemplary griddle 200. In this example, the cooking appliance 100 is shown as a free standing cooking range, but in alternate embodiments, the cooking appliance may be, for example, any suitable cooking appliance having surface heating units including, but not limited to, free standing gas and/or electric cooking ranges, cabinet mounted cooktops and portable grilling units.

The cooking appliance 100 includes a cooktop surface 100a having five surface heating units such as electric burners 101-105, an oven 110 disposed below the cooktop surface 100a, six control knobs 111-116, and a display 120. The electric burners 101-105 may have any suitable heat rating. More specifically, the electric burners 101-105 may all have the same heat rating or one or more of the electric burners may have a heat rating different from heat ratings of the other electric burners. Each of the control knobs 111-116 is configured to allow operation of a respective one of the burners 101-105 and the oven 110. The display 120 may be configured to present any suitable information related to the operation of the cooking appliance 100.

As clearly illustrated in FIG. 1, in this example, the griddle 200 is placed over the electric burners 101, 102. The griddle 200 can be placed over other electric burners such as burners 102, 103 or burners 103, 104.

The griddle 200 is preferably made of cast iron. It can be made of other thermally conductive materials commonly used in the art such as aluminum, stainless steel.

As illustrated in FIGS. 2-6, in this embodiment, the griddle 200 has a generally rectangular shape and is approximately 20" long, 9.66" wide and 1.3" thick (i.e., high). The griddle 200 has a main body 201 having a first or top surface 202, and a second or bottom surface 203 which is opposite and substantially parallel to the top surface 202.

To more evenly distribute the heat, the main body 201 also has two recessed areas 205 which are formed on the bottom surface 203. Each recessed area 205 has a center 206, a periphery 207 and is configured so that it has a thickness that diminishes from the periphery 207 toward the center 206.

Figure 5:
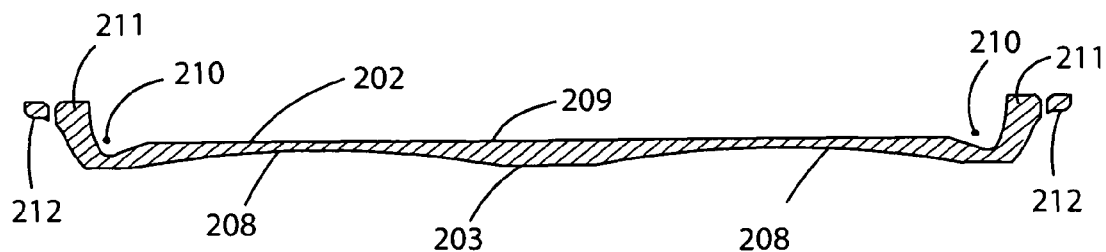
FIG. 5 is a view along line V-V in FIG. 4.
Figure 6:
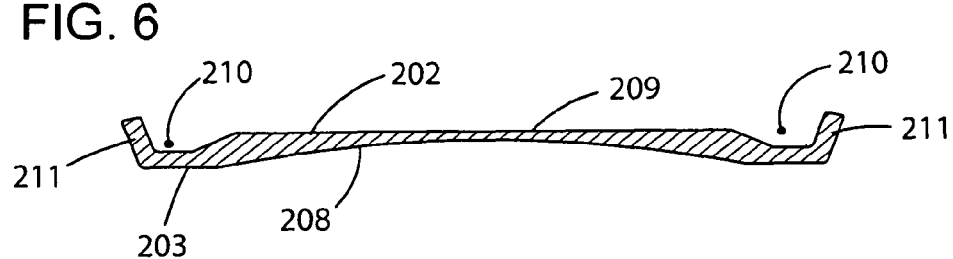
FIG. 6 is a view along line VI-VI in FIG. 4.

As clearly shown in FIGS. 5 and 6, each recessed area 205 has a curved or concave surface 208 which faces away from the top surface 202. In this embodiment, the concave surface 208 can have a substantially spherical shape or a substantially parabolic shape; and the thickness is preferably in the range of approximately 0.1" to 0.15" at the center 206, more preferably approximately 0.12" at the center 206. Furthermore, preferably, each recessed area 205 has a shape and a size that substantially match those of the heating elements of the respective electric burner 101, 102. In this particular embodiment, since the heating element of each electric burner 101, 102 is approximately 7" in diameter, the periphery 207 of each recessed area 205 preferably forms a circle of approximately 7" in diameter. When properly placed on the cooking appliance 100, the griddle 200 covers the electric burners 101, 102 with the two recessed areas 205 being substantially aligned with the electric burners 101, 102. Since the heating elements of the electric burners 101, 102 can have different shapes, sizes and/or heat ratings, the two recessed areas 205 can have different shapes and sizes as well, as illustrated in FIGS. 4A, 4B and 4C. The griddles 200a, 200c shown in FIGS. 4A and 4C are substantially similar to the griddle 200, with the exception that the periphery of one of the recessed areas is in a shape other than a circle. Similarly, the griddle 200b shown in FIG. 4B is substantially similar to the griddle 200, with the exception that the peripheries of the recessed areas 205, 205b form circles of different diameters. However, the periphery of a recessed area does not have to match the heating element of the electric burner. For example, a substantially square shaped recessed area can be used for a circle electric burner.

Figure 3:
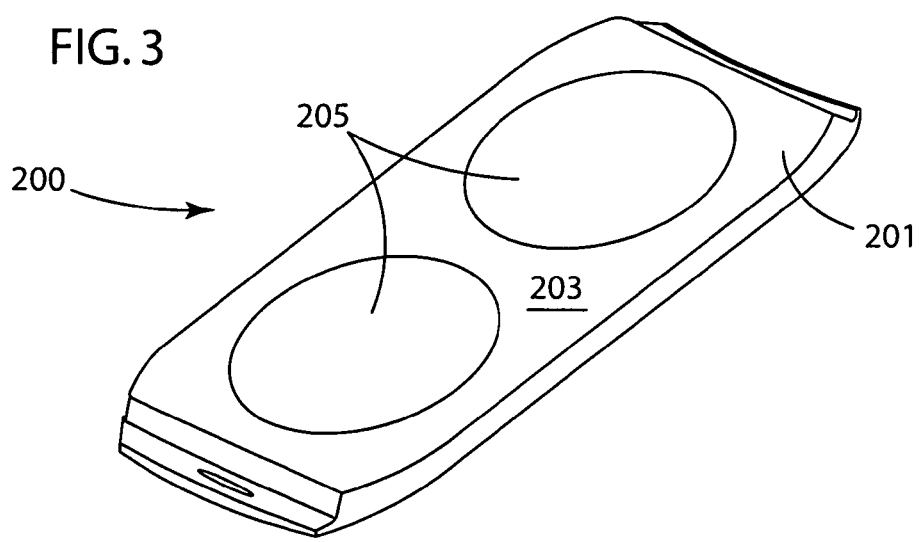
FIG. 3 is another perspective view of the griddle of FIG. 1, showing its bottom surface.

As illustrated in FIG. 3, the areas of the bottom surface 203 that surround each recessed area 205 is substantially flat. Each recessed area 205 has a thickness of approximately 0.45" at the periphery 207.

Figure 2:
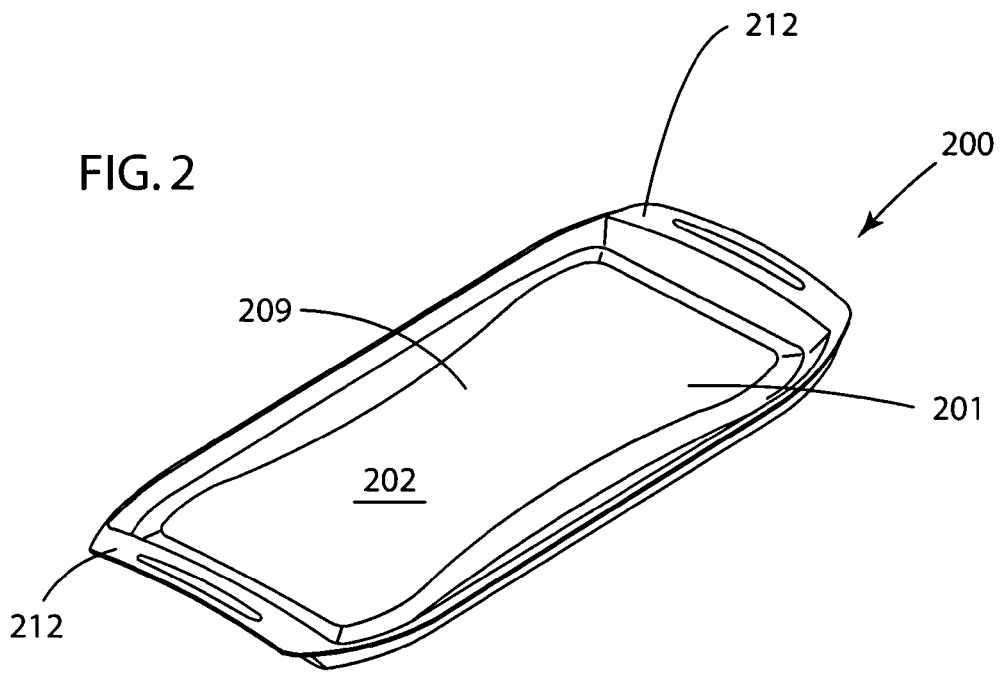
FIG. 2 is a perspective view of the griddle of FIG. 1.

As clearly shown in FIGS. 2, 5 and 6, the top surface 202 has a generally rectangular cooking area 209 that is substantially flat and extends over the recessed areas 205. Preferably, the top surface 202 has a liquid collecting channel or trench 210 for collecting cooking byproduct such as grease. The liquid collecting trench 210 surrounds the cooking area 209 and preferably forms a loop. The top surface 202 also has an edge 211 which surrounds the liquid collecting trench 210 and extends upward above the cooking area 209. Also, preferably two opposite handles 212 extend outward from the edge 211 (see FIGS. 2 and 4).

Figure 8:
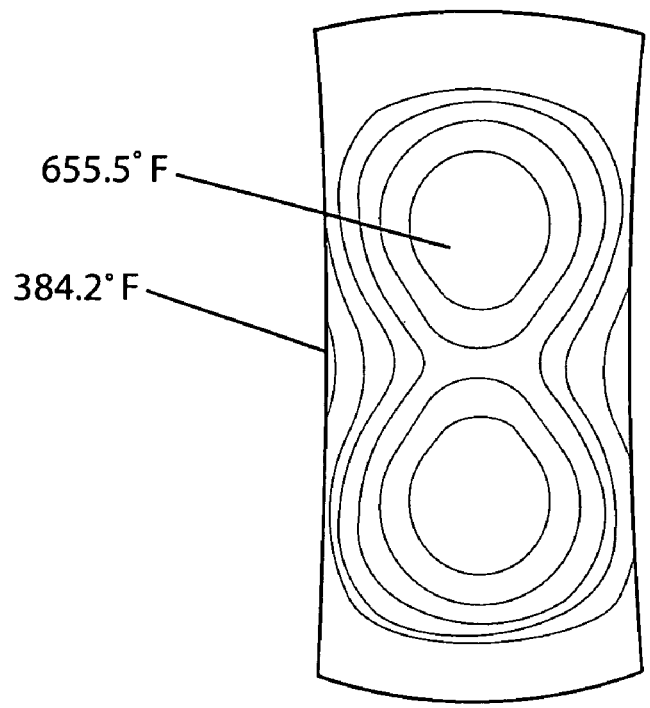
FIG. 8 shows a temperature gradient of a conventional griddle.
Figure 9:
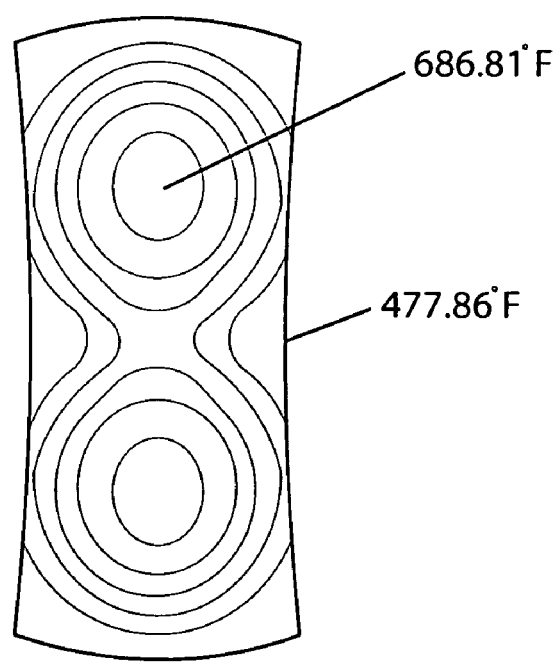
FIG. 9 shows a temperature gradient of the griddle of FIG. 1.

As best seen in FIGS. 8 and 9, the recessed areas 205 contribute to a better heat distribution. FIG. 8 illustrates the temperature distribution over the surface of a conventional griddle of essentially constant thickness. FIG. 9 illustrates the temperature distribution over the surface of the exemplary griddle 200. From these figures, it can be seen that the griddle 200 reduces the maximum temperature gradient by about 23% (the conventional griddle of FIG. 8 has a maximum temperature gradient of about 271° F. while the griddle 200 embodying the present invention has a maximum temperature gradient of about 209° F. (271−209)/271=0.2288)).

Figure 7:
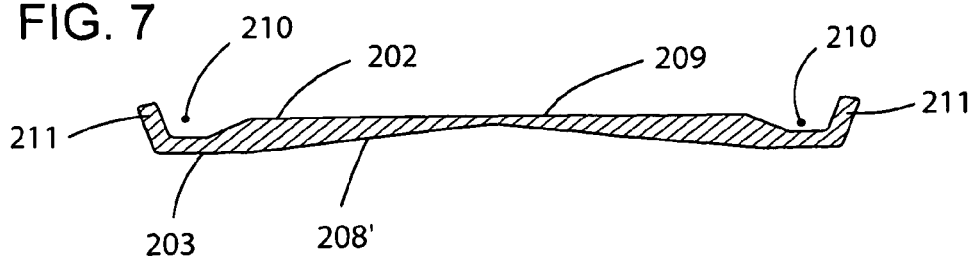
FIG. 7 shows a variation of the griddle of FIG. 1.

While the invention has been described in terms of various specific embodiments, those skilled in the art will recognize that the invention can be practiced with modification within the spirit and scope of the claims. For example, as shown in FIG. 7, each recessed area 205 could have a generally conically shaped surface 208'. Moreover, features of various embodiments/variations can be combined. Thus, while there have shown, described and pointed out fundamental novel features of the invention as applied to various specific embodiments thereof, it will be understood that various omissions, substitutions and changes in the form and details of the devices illustrated and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A griddle for a cooking appliance, the griddle comprising:
   a main body having a first surface, a second surface opposite the first surface, and an area of varying thickness formed on the second surface, the area of varying thickness having a center, a periphery, and a thickness which diminishes from the periphery toward the center, wherein the area of varying thickness defines a recessed area oriented to face at least one heating unit of a cooking appliance and defines a geometry that substantially matches the geometry of the at least one heating unit.

2. The griddle of claim 1, wherein the recessed area has a concave surface.

3. The griddle of claim 2, wherein the concave surface has one of a spherical shape and a parabolic shape.

4. The griddle of claim 1, wherein the recessed area has a conical surface.

5. The griddle of claim 1, wherein the thickness is in the range of approximately 0.1" to 0.15" at the center.

6. The griddle of claim 5, wherein the thickness is approximately 0.12" at the center.

7. The griddle of claim 5, wherein the thickness is approximately 0.45" at the periphery.

8. The griddle of claim 1, wherein the thickness is approximately 0.45" at the periphery.

9. The griddle of claim 1, wherein the periphery forms a circle.

10. A griddle for a cooking appliance having at least one surface heating unit, the griddle comprising:
    a thermally conductive main body having a top surface, a bottom surface, and an area of varying thickness formed on the bottom surface, the area of varying thickness having a center, a periphery, and a thickness which diminishes from the periphery toward the center, wherein the area of varying thickness defines a recessed area oriented to face the at least one surface heating unit on the cooking appliance and defines a geometry that substantially matches the geometry of the at least one surface heating unit,
    wherein when the griddle is properly placed on the cooking appliance, the area of varying thickness is configured to be substantially aligned with the at least one surface heating unit.

11. The griddle of claim 10, wherein the recessed area has a concave surface.

12. The griddle of claim 11, wherein the concave surface has one of a spherical shape and a parabolic shape.

13. The griddle of claim 10, wherein the periphery forms a circle of approximately 7" in diameter, the thickness being in the range of approximately 0.1" to 0.15" at the center, and approximately 0.45" at the periphery.

14. The griddle of claim 13, wherein the thickness is approximately 0.12" at the center.

15. The griddle of claim 13, wherein the top surface has a substantially flat cooking area.

16. The griddle of claim 15, wherein the top surface also has a liquid collecting trench surrounding the cooking area, and an edge surrounding the liquid collecting trench.

17. The griddle of claim 10, wherein the main body comprises cast iron.

18. The griddle of claim 10, wherein the recessed area has a conical surface.

19. The griddle of claim 10, wherein the cooking appliance has a plurality of surface heating units and the main body of the griddle has a plurality of areas of varying thickness, each area defining a periphery that substantially matches a periphery of a corresponding surface heating unit.

20. The griddle of claim 10, wherein the cooking appliance has a plurality of surface heating units and the main body of the griddle has a plurality of areas of varying thickness, and wherein the periphery of one area of varying thickness is substantially different from the periphery of another area of varying thickness.

* * * * *